United States Patent
Chen et al.

(10) Patent No.: US 12,477,063 B2
(45) Date of Patent: Nov. 18, 2025

(54) PROCESSING METHOD FOR PRIORITY NOTIFICATION OF INCOMING CALL AND MOBILE DEVICE

(71) Applicant: ASUSTeK COMPUTER INC., Taipei (TW)

(72) Inventors: Yen-Ling Chen, Taipei (TW); Pei Chen, Taipei (TW); Pu-Chien Lee, Taipei (TW); Jen-Pang Hsu, Taipei (TW); Chao-Hsien Huang, Taipei (TW)

(73) Assignee: ASUSTEK COMPUTER INC., Taipei (TW)

(*) Notice: Subject to any disclaimer, the term of this patent is extended or adjusted under 35 U.S.C. 154(b) by 370 days.

(21) Appl. No.: 17/726,598

(22) Filed: Apr. 22, 2022

(65) Prior Publication Data

US 2022/0360667 A1    Nov. 10, 2022

(30) Foreign Application Priority Data

May 6, 2021 (TW) ................................. 110116449

(51) Int. Cl.
*H04M 3/02* (2006.01)
*H04M 3/436* (2006.01)

(52) U.S. Cl.
CPC ........... *H04M 3/4365* (2013.01); *H04M 3/02* (2013.01)

(58) Field of Classification Search
CPC .. H04M 3/4365; H04M 3/02; H04M 3/42187; H04M 2201/12; H04M 2201/14; H04M 3/42042
See application file for complete search history.

(56) References Cited

U.S. PATENT DOCUMENTS

| 2014/0101611 | A1* | 4/2014 | Lang | G06F 3/04842 |
| | | | | 709/204 |
| 2015/0117444 | A1* | 4/2015 | Sandblad | H04L 65/1096 |
| | | | | 370/352 |
| 2016/0080561 | A1* | 3/2016 | Wei | H04M 1/64 |
| | | | | 455/414.1 |

(Continued)

FOREIGN PATENT DOCUMENTS

| CN | 103795840 A | 5/2014 |
| CN | 104348943 B | 8/2016 |

(Continued)

*Primary Examiner* — Kenneth T Lam

(74) *Attorney, Agent, or Firm* — McClure, Qualey & Rodack, LLP

(57) ABSTRACT

The disclosure provides a processing method for a priority notification of an incoming call and a mobile device. The processing method for a priority notification of an incoming call is applied to a mobile device. The processing method includes: receiving an incoming call signal and generating a notification signal when a plurality of trigger conditions is met. The trigger conditions include: determining, according to the incoming call signal, that a repeated call is within a first preset time or a time interval between repeated calls is less than a second preset time, that a caller number corresponding to the incoming call signal is in a priority contact list, and that the mobile device is in a preset use situation. Then, a mandatory reminder mode is activated according to the notification signal to notify a user.

17 Claims, 4 Drawing Sheets

(56) References Cited

U.S. PATENT DOCUMENTS

| | | | | |
|---|---|---|---|---|
| 2018/0343338 A1* | 11/2018 | Prasad | .................... | H04W 4/23 |
| 2019/0014208 A1* | 1/2019 | Fiorini | .................. | H04M 1/663 |
| 2020/0379565 A1* | 12/2020 | Fleizach | .............. | G04G 13/026 |
| 2021/0176608 A1* | 6/2021 | Kumar Agrawal | ... | H04W 68/00 |
| 2022/0086282 A1* | 3/2022 | Shirahatti | ............. | H04M 7/006 |
| 2022/0286942 A1* | 9/2022 | Muniyan | ................ | H04W 4/16 |

FOREIGN PATENT DOCUMENTS

| | | | |
|---|---|---|---|
| CN | 105847567 A | 8/2016 |
| CN | 106534588 A | 3/2017 |
| CN | 106713672 A | 5/2017 |
| CN | 109922217 A | 6/2019 |

* cited by examiner

PROCESSING METHOD FOR PRIORITY NOTIFICATION OF INCOMING CALL AND MOBILE DEVICE

CROSS-REFERENCE TO RELATED APPLICATION

This application claims the priority benefit of Taiwan Application Serial No. 110116449, filed on May 6, 2021. The entirety of the above-mentioned patent application is hereby incorporated by reference herein and made a part of specification.

BACKGROUND OF THE INVENTION

Field of the Invention

The disclosure relates to a processing method for a priority notification of an incoming call and a mobile device for performing the processing method.

Description of the Related Art

With the popularity of mobile devices, mobile phones have entered all aspects of modern life. However, on some specific occasions, to avoid unexpected call disturb, mobile phones are usually set to a silent mode or a do not disturb (DND) mode.

When a user selects the silent mode, there is no any vibration or ringing reminder with an incoming call. Therefore, an important incoming call is likely to be missed, causing a missed call. When the user activates the DND mode, incoming call ringing is set for a specific contact, or incoming call ringing is repeated within three minutes. However, a prerequisite for ringing or vibration is that a ringing mode or a vibration mode is set. Even though a switch that allows ringing is on for the repeated call, the incoming call does not ring or vibrate to notify the user in the silent mode. As a result, when the silent mode or DND mode is activated, without ringing or vibration, an incoming call of an important contact is likely to be missed, which causes inconvenience.

BRIEF SUMMARY OF THE INVENTION

According to the first aspect, a processing method for a priority notification of an incoming call is provided. The processing method is applied to a mobile device and includes: receiving an incoming call signal and generating a notification signal when a plurality of trigger conditions is met. The trigger conditions include: determining that a repeated call is within a first preset time or a time interval between repeated calls is less than a second preset time according to the incoming call signal, determining that a caller number corresponding to the incoming call signal is in a priority contact list, and determining that the mobile device is in a preset use situation. Then, a mandatory reminder mode is activated according to the notification signal to notify a user.

According to the second aspect, a mobile device is provided, including a communication unit, a processor, and at least a reminder unit. The processor is electrically connected to the communication unit and the reminder unit. The communication unit receives an incoming call signal. The processor determines whether a plurality of trigger conditions is met and generates a notification signal when the trigger conditions are met according to the incoming call signal. The trigger conditions include: The processor determines that a repeated call is within a first preset time or a time interval between repeated calls is less than a second preset time according to the incoming call signal, the processor determines that a caller number corresponding to the incoming call signal is in a priority contact list, and the processor determines that the mobile device is in a preset use situation. The reminder unit activates a mandatory reminder mode according to the notification signal to notify a user.

To sum up, the disclosure provides a processing method for a priority notification of an incoming call and a mobile device, which provide a priority notification mode. In a state that a silent mode or DND mode is activated, when a second incoming call is within a preset time, the mobile device rings or vibrates in a mandatory manner to remind a user of an incoming call of an important contact, to avoid missing an important phone call. In addition, the disclosure allows the user to set a priority contact list and flexibly set an important contact whose incoming call cannot be missed.

DETAILED DESCRIPTION OF THE EMBODIMENTS

Figure 1:
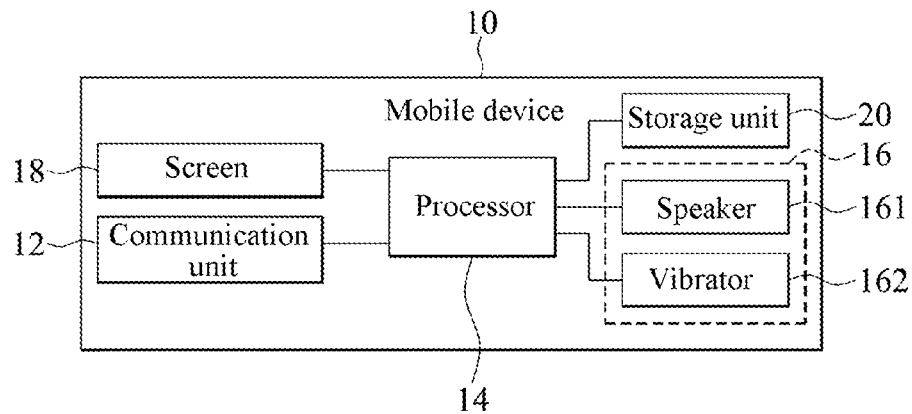
FIG. 1 is a schematic block diagram of a mobile device according to an embodiment of the disclosure.

Referring to FIG. 1, a mobile device 10 includes a communication unit 12, a processor 14, at least one reminder unit 16, a screen 18, and a storage unit 20. In this embodiment, the at least one reminder unit 16 is exemplified by two reminder units, which are respectively a speaker 161 and a vibrator 162. The processor 14 is electrically connected to the communication unit 12, the reminder unit 16 (the speaker 161 and the vibrator 162), the screen 18, and the storage unit 20 respectively.

When the mobile device 10 executes a priority notification mode, the communication unit 12 supports a current wireless signal transmission technology to receive an incoming call signal and transmits the incoming call signal to the processor 14. After receiving the incoming call signal, the processor 14 determines, according to the incoming call signal, whether a plurality of trigger conditions is met and generates a notification signal when the trigger conditions are met. The trigger conditions include: the processor 14 determines that a repeated call is within a preset time (that is, a first preset time) or a time interval between repeated calls is less than a preset time (that is, a second preset time) according to the incoming call signal, the processor 14 determines that a caller number corresponding to the incoming call signal is in a priority contact list, and the processor 14 determines that the mobile device 10 is in a preset use situation. The notification signal generated by the processor 14 is transmitted to the reminder unit 16 to make the reminder unit 16 to activate a mandatory reminder mode according to the notification signal to notify a user. In an embodiment, when the reminder unit 16 is the speaker 161, the mandatory reminder mode is an incoming call ringing mode for reminding the user by ringing, or when the reminder unit 16 is the vibrator 162, the mandatory reminder mode is an incoming call vibration mode for reminding the user by vibration. When the mandatory reminder mode is activated, the processor 14 transmits information about an important contact corresponding to the incoming call signal to the screen 18 and displays the information on the screen 18, so that the user knows which important contact calls, to be actually aware of an incoming call of the important contact. The storage unit 20 is configured to store calculation materials or data required by the processor 14, including the preset time (including at least one of the first preset time or the second preset time), the priority contact list, the preset use situation, the mandatory reminder mode, and the like.

Figure 2:
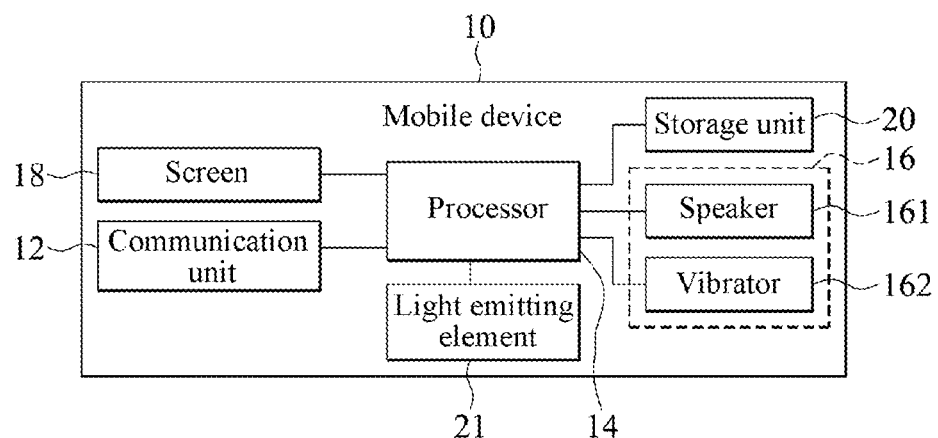
FIG. 2 is a schematic block diagram of a mobile device according to another embodiment of the disclosure.

To remind the user of the incoming call of the important contact, when activating the mandatory reminder mode, the processor 14 activates a flashing mode at the same time. In an embodiment, when activating the mandatory reminder mode, the processor 14 activates a flashing mode through the screen 18 at the same time to make the screen 18 flash. In another embodiment, as shown in FIG. 2, the mobile device 10 is further provided with at least one light emitting element 21 such as a light-emitting diode (LED). The light emitting element 21 is electrically connected to the processor 14. When activating the mandatory reminder mode, the processor 14 drives the light emitting element 21 to activate a flashing mode through the light emitting element 21 at the same time, so that the light emitting element 21 flashes together with the ringing or vibration, to remind the user in double reminder manners.

In an embodiment, the mobile device 10 is a mobile phone, a personal digital assistant (PDA), a mobile multimedia player, or any type of portable electronic product that receives an incoming call. The disclosure is not limited thereto.

In an embodiment, the processor 14 is but not limited to a central processing unit (CPU), a microprocessor, a digital signal processor (DSP), an application-specific integrated circuit (ASIC), a system on a chip (SOC), or another similar element or a combination thereof.

In an embodiment, the storage unit 20 is disposed separately from the processor 14, or built in the processor 14, which depends on user requirements or actual electric circuit designs. Based on this, the storage unit 20 is implemented by one or more storage elements. The storage element is, in an embodiment, a memory, a register, or the like, but the disclosure is not limited thereto.

Figure 3:
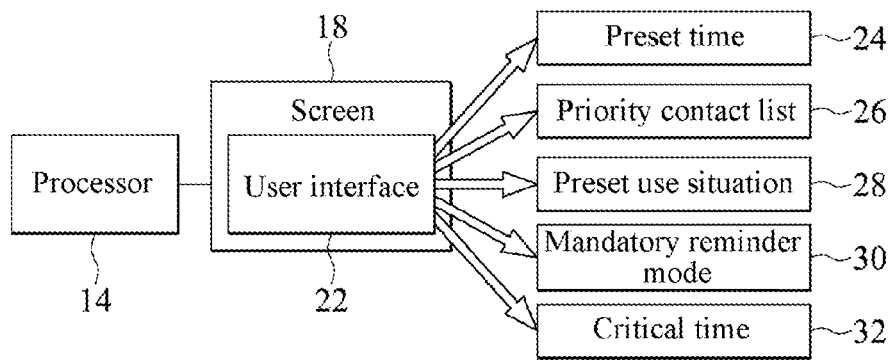
FIG. 3 is a schematic block diagram of setting conditions through a user interface (UI) according to an embodiment of the disclosure.

When the processor 14 executes the priority notification mode, a user sets parameter conditions related to the priority notification mode first. Referring to FIG. 1 to FIG. 3, the processor 14 provides a UI 22 and displays the UI 22 on the screen 18. The user performs setting by operating the UI 22, to respectively set at least one of a preset time 24, the priority contact list 26, the preset use situation 28, or the mandatory reminder mode 30. The parameter conditions are set in no order of priority and are set in any order. The set preset time 24, priority contact list 26, preset use situation 28, mandatory reminder mode 30, and the like are stored in the storage unit 20. In an embodiment, the preset time 24 includes at least one of the first preset time or the second preset time. In an embodiment, the screen 18 is a touchscreen for directly performing setting through the touchscreen. In another embodiment, the screen 18 displays the UI 22 only and cooperates with a combination of physical keys on the mobile device 10 for setting. The disclosure is not limited thereto.

In an embodiment, the user selects a first preset time for determining whether a repeated call is within the first preset time as the trigger condition. In an embodiment, options such as 3 minutes, 5 minutes, and 15 minutes are set on the UI 22 for selection.

In another embodiment, the user selects a second preset time for determining whether a time interval between repeated calls is less than the second preset time as the trigger condition. In an embodiment, options such as 3 minutes, 5 minutes, and 15 minutes are set on the UI 22 for selection.

In an embodiment, the priority contact list 26 directly adopts a DND mode contact list in a DND mode, or a custom contact list for the user to select to set an important contact.

In an embodiment, the preset use situation 28 is a DND mode or a silent mode, or includes both the DND mode and the silent mode, so that the user selects situations in which the priority notification mode is executed. Specifically, in a case that the preset use situation 28 is set to the DND mode, the processor 14 executes the priority notification mode only when the DND mode is activated; and in a case that the preset use situation 28 is set to the silent mode, the processor 14 executes the priority notification mode only when the silent mode is activated. Definitely, in a case that the preset use situation 28 is set to the DND mode and the silent mode, the processor 14 executes the priority notification mode when the DND mode or the silent mode is activated.

In an embodiment, the mandatory reminder mode 30 is an incoming call ringing mode or an incoming call vibration mode, to set a priority manner to remind the user. Specifically, when the user sets the mandatory reminder mode 30 to the incoming call ringing mode, the processor 14 transmits the notification signal to the speaker 161 to make the speaker 161 activate the incoming call ringing mode and remind the user by ringing. When the user sets the mandatory reminder mode 30 to the incoming call vibration mode, the processor 14 transmits the notification signal to the vibrator 162 to make the vibrator 162 activate the incoming call vibration mode and remind the user by vibration.

Based on the foregoing mobile device 10, the disclosure further provides a processing method for a priority notification of an incoming call, suitable for the mobile device 10. Steps of the processing method for a priority notification of an incoming call are described in detail below with reference to the mobile device 10.

Figure 4:
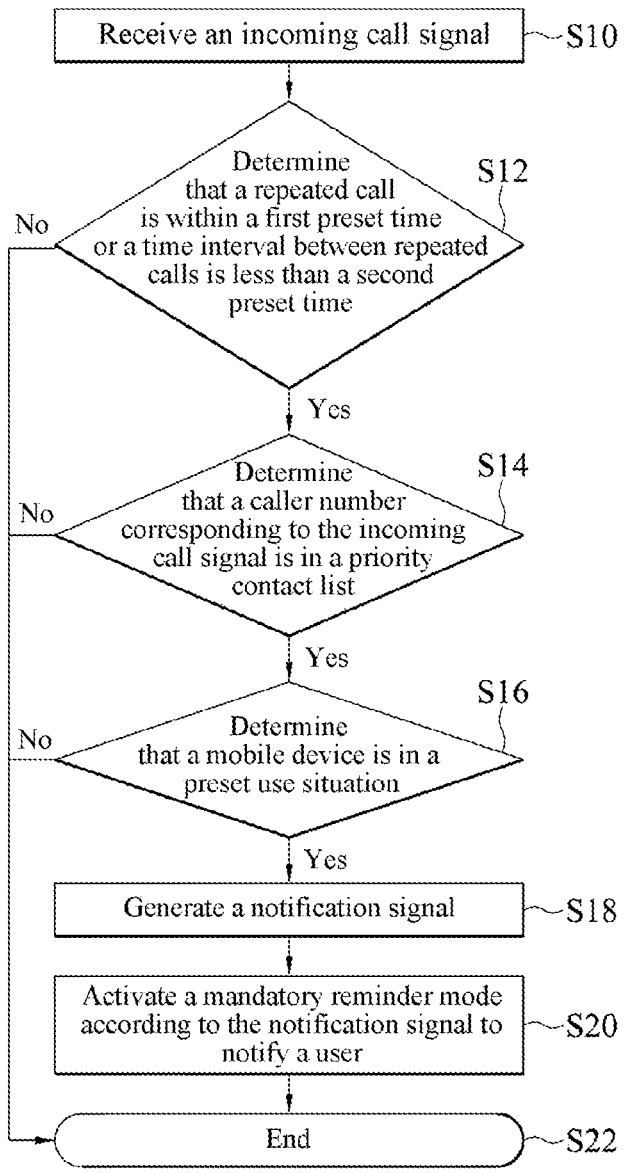
FIG. 4 is a schematic flowchart of a processing method for a priority notification of an incoming call according to an embodiment of the disclosure.

In an embodiment, referring to FIG. 1 and FIG. 4, the processing method for a priority notification of an incoming call includes at least steps S10 to S22. First, as shown in step S10, the communication unit 12 receives an incoming call signal. As shown in step S12, the processor 14 first determines, according to the incoming call signal, whether a repeated call is within a first preset time or a time interval between repeated calls is less than a second preset time. When the processor 14 determines that the incoming call signal is actually the repeated call within the first preset time or the time interval between the repeated calls is actually less than the second preset time (either condition is met), next step S14 is performed. Otherwise, step S22 is directly performed, and the entire priority notification mode is ended. As shown in step S14, the processor 14 determines whether a caller number corresponding to the incoming call signal is in a priority contact list (a DND mode contact list or a custom contact list). When the caller to whom the caller number belongs is actually in the priority contact list, step S16 is further performed. Otherwise, step S22 is directly performed, and the entire priority notification mode is ended. As shown in step S16, the processor 14 determines whether the mobile device 10 is in a preset use situation. When the mobile device 10 is in the preset use situation, step S18 is further performed. Otherwise, step S22 is directly performed, and the entire priority notification mode is ended. After all the trigger conditions in steps S12, S14, and S16 are met, as shown in step S18, the processor 14 generates a notification signal to the reminder unit 16 (the speaker 161 or the vibrator 162). As shown in step S20, the reminder unit 16 activates a mandatory reminder mode (an incoming call ringing mode or an incoming call vibration mode) according to the notification signal to notify a user of an incoming call of an important contact by ringing or vibration.

Figure 5:
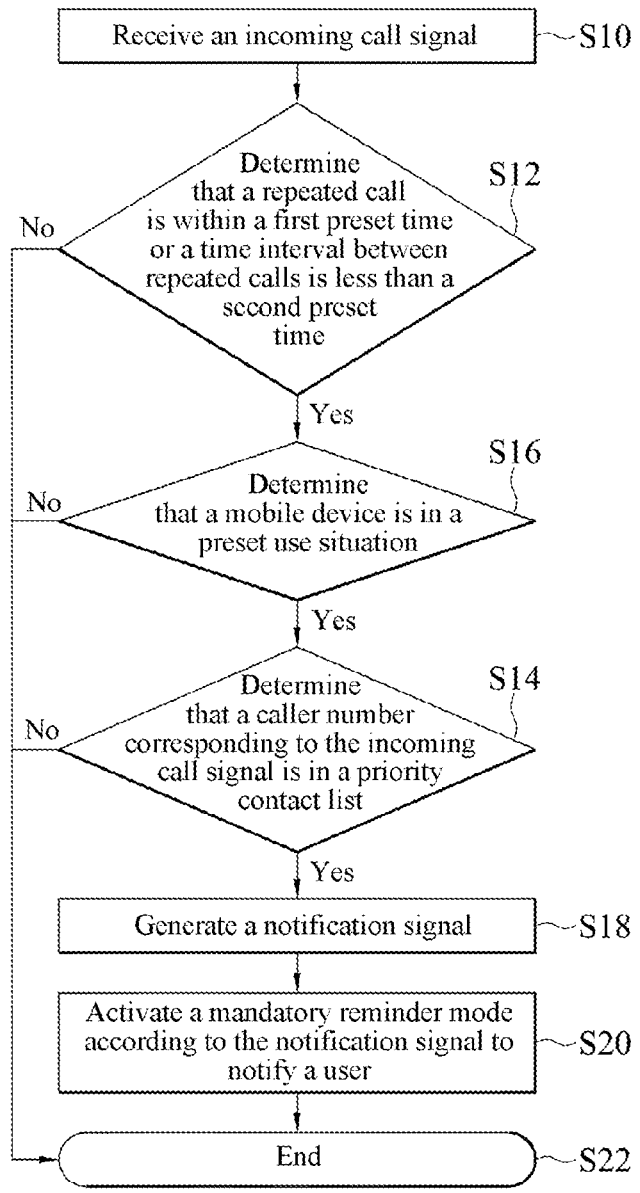
FIG. 5 is a schematic flowchart of a processing method for a priority notification of an incoming call according to another embodiment of the disclosure.

In another embodiment, referring to FIG. 1 and FIG. 5, the processing method for a priority notification of an incoming call includes at least steps S10 to S22. First, as shown in step S10, the communication unit 12 receives an incoming call signal. As shown in step S12, the processor 14 first determines, according to the incoming call signal, whether a repeated call is within a first preset time or a time interval between repeated calls is less than a second preset time. When the processor 14 determines that the incoming call signal is actually the repeated call within the first preset time or the time interval between the repeated calls is actually less than the second preset time, next step S16 is performed. Otherwise, step S22 is directly performed, and the entire priority notification mode is ended. As shown in step S16, the processor 14 determines whether the mobile device 10 is in a preset use situation. When the mobile device 10 is in the preset use situation, step S14 is further performed. Otherwise, step S22 is directly performed, and the entire priority notification mode is ended. Further, as shown in step S14, the processor 14 determines whether a caller number corresponding to the incoming call signal is in a priority contact list (a DND mode contact list or a custom contact list). When the caller to whom the caller number belongs is actually in the priority contact list, step S18 is further performed. Otherwise, step S22 is directly performed, and the entire priority notification mode is ended. After all the trigger conditions in steps S12, S16, and S14 are met, as shown in step S18, the processor 14 generates a notification signal to the reminder unit 16 (the speaker 161 or the vibrator 162). As shown in step S20, the reminder unit 16 activates a mandatory reminder mode (an incoming call ringing mode or an incoming call vibration mode) according to the notification signal to notify a user of an incoming call of an important contact by ringing or vibration.

Figure 6:
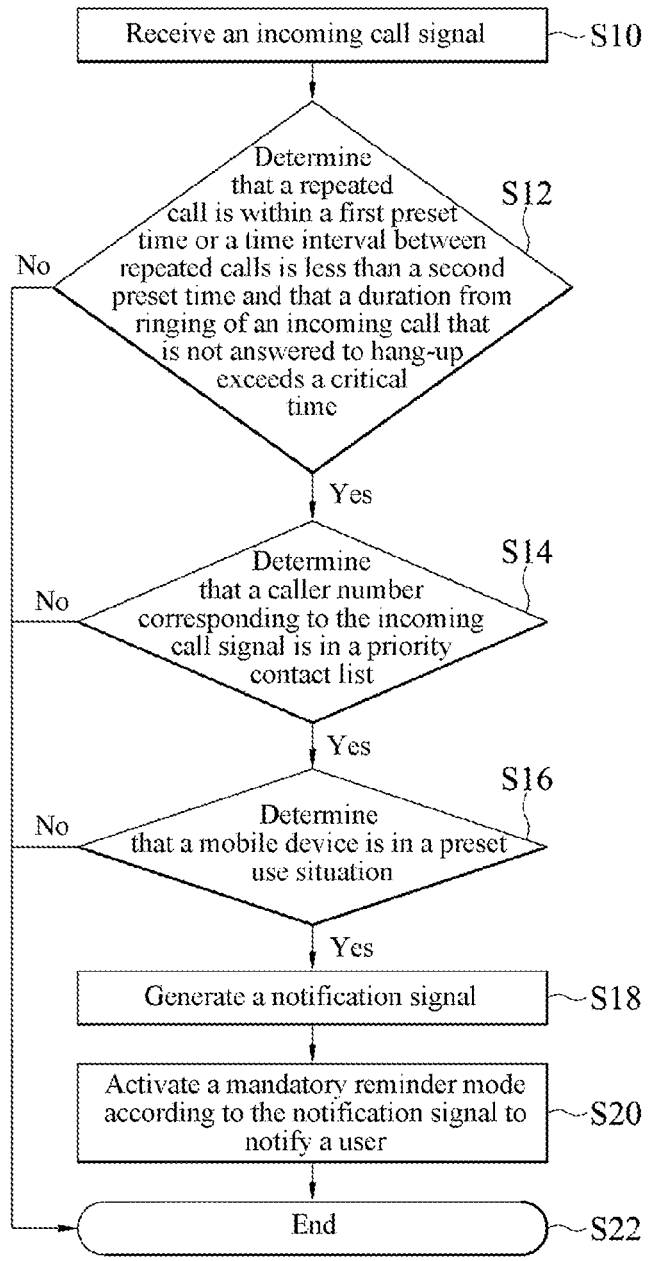
FIG. 6 is a schematic flowchart of a processing method for a priority notification of an incoming call according to still another embodiment of the disclosure.

In an embodiment, referring to FIG. 1 and FIG. 6, when the processor 14 determines whether the trigger conditions are met, as shown in step S12, the processor 14 determines, according to the incoming call signal, the trigger condition of whether the repeated call is within the first preset time or the time interval between the repeated calls is less than the second preset time, and further considers a duration of the incoming call. That is, the trigger condition further includes: determining, according to the incoming call signal, that the repeated call is within the first preset time or the time interval between the repeated calls is less than the second preset time and a duration from ringing of an incoming call that is not answered to hang-up exceeds a critical time. The processor 14 determines whether the incoming call signal is the repeated call within the first preset time or the time interval between the repeated calls is less than the second preset time and the duration from ringing of an incoming call that is not answered to hang-up exceeds the critical time at the same time. After the two conditions are met, subsequent steps S14 to S20 are further performed. As long as either of the conditions is not met, the entire priority notification mode is directly ended as in step S22. Apart from step S12, other steps are the same as those in the foregoing embodiment shown in FIG. 4. Therefore, reference is made to the foregoing description, and details are not repeated herein.

As shown in FIG. 1 to FIG. 3, when the limit is added to the trigger conditions, during setting phases of the preset time 24, the priority contact list 26, the preset use situation 28, and the mandatory reminder mode 30 through the UI 22, further, a length of a critical time 32 is set through the UI 22. In an embodiment, options such as 10 seconds, 20 seconds, or 30 seconds are set on the UI 22 for selection to set the critical time 32. The set critical time 32 is stored in the storage unit 20.

Therefore, compared with the existing silent mode and DND mode, the priority notification mode used in the disclosure has the following characteristics: For a specific contact, a ringing mode or a vibration mode is selected to be used to notify the user of the incoming call in the silent mode. A second incoming call within a preset time is set to notify the user by ringing or vibration. The DND mode contact list is directly applied, or the contact list is customized. A situation in which the priority notification mode is activated is selected. As for a missed call caused by no ringing or vibration in the silent mode/DND mode, through the priority notification mode, when the second incoming call is within the preset time, the user is notified by mandatory ringing or vibration to avoid missing the incoming call of the important contact. A flashing effect is further provided to better remind the user during the mandatory ringing or vibration.

In an embodiment, the processing method for a priority notification of an incoming call provided in the disclosure is implemented by a computer program product. The processing method for a priority notification of an incoming call according to any one of the foregoing embodiments is completed after the mobile device loads a program into the processor and executes the program. In other words, the processing method for a priority notification of an incoming call is implemented on the mobile device by the processor performing a firmware or software algorithm.

To sum up, the disclosure provides a processing method for a priority notification of an incoming call and a mobile device, which provide a priority notification mode. In a state that a silent mode or DND mode is activated, when a second incoming call is within a preset time, the mobile device rings or vibrates in a mandatory manner to remind a user of an incoming call of an important contact, to avoid missing an important phone call. In addition, the disclosure allows the user to set a priority contact list and flexibly set an important contact whose incoming call cannot be missed.

The foregoing embodiments are merely used to describe technical ideas and characteristics of the disclosure, which are intended to enable a person familiar with the technology to understand and implement the content of the disclosure, but do not limit claims of the disclosure. All equivalent changes or modifications without departing from the spirit disclosed in the disclosure still fall within the claims of the disclosure.

What is claimed is:

1. A processing method for a priority notification of an incoming call, applied to a mobile device, the processing method comprising:
receiving an incoming call signal and generating a notification signal when the following trigger conditions are met:
determining that a time interval between repeated calls is less than a preset time according to the incoming call signal and that a duration from ringing of the repeated calls that are not answered to hang-up exceeds a predetermined threshold, wherein the duration is a cumulative time of the ringing of the not answered, repeated calls,
determining that a caller number corresponding to the incoming call signal is in a priority contact list, and
determining that the mobile device is in a preset use situation; and
activating a mandatory reminder mode according to the notification signal to notify a user;
wherein the preset use situation comprises both a do not disturb (DND) mode and a silent mode.

2. The processing method for a priority notification of an incoming call according to claim 1, wherein the trigger conditions further comprise: the incoming call signal is that the time interval between the repeated calls is less than the preset time and a duration from ringing of an incoming call that is not answered to hang-up exceeds a critical time.

3. The processing method for a priority notification of an incoming call according to claim 1, wherein the priority contact list is a custom contact list or a do not disturb (DND) mode contact list.

4. The processing method for a priority notification of an incoming call according to claim 1, wherein the mandatory reminder mode is an incoming call ringing mode or an incoming call vibration mode.

5. The processing method for a priority notification of an incoming call according to claim 4, wherein a flashing mode is further activated when the incoming call ringing mode or the incoming call vibration mode is activated.

6. A mobile device, comprising:
a communication unit, receiving an incoming call signal;
a processor, electrically connected to the communication unit, the processor determining whether a plurality of trigger conditions is met according to the incoming call signal and generating a notification signal when the trigger conditions are met, the trigger conditions comprising: the processor determines that a time interval between repeated calls is less than a preset time according to the incoming call signal and that a duration from ringing of the repeated calls that are not answered to hang-up exceeds a predetermined threshold, wherein the duration is a cumulative time of the ringing of the not answered, repeated calls, the processor determines that a caller number corresponding to the incoming call signal is in a priority contact list, and the processor determines that the mobile device is in a preset use situation; and
at least a reminder unit, electrically connected to the processor, to activate a mandatory reminder mode according to the notification signal to notify a user;
wherein the preset use situation comprises both a do not disturb (DND) mode and a silent mode.

7. The mobile device according to claim 6, wherein the trigger conditions further comprise: determining, according to the incoming call signal, that the time interval between the repeated calls is less than the preset time and a duration from ringing of an incoming call that is not answered to hang-up exceeds a critical time.

8. The mobile device according to claim 7, further comprising a screen, electrically connected to the processor, the processor providing a user interface (UI) and displaying the UI on the screen, to set at least one of the preset time, the critical time, the priority contact list, the preset use situation, or the mandatory reminder mode.

9. The mobile device according to claim 6, wherein the priority contact list is a custom contact list or a do not disturb (DND) mode contact list.

10. The mobile device according to claim 6, wherein when the mandatory reminder mode is an incoming call ringing mode, the reminder unit is a speaker.

11. The mobile device according to claim 6, wherein when the mandatory reminder mode is an incoming call vibration mode, the reminder unit is a vibrator.

12. The mobile device according to claim 6, further comprising a screen, electrically connected to the processor, the processor providing a user interface (UI) and displaying the UI on the screen, to set at least one of the preset time, the priority contact list, the preset use situation, or the mandatory reminder mode.

13. The mobile device according to claim 12, wherein the screen is a touchscreen.

14. The mobile device according to claim 6, further comprising a screen, electrically connected to the processor, the processor further activating a flashing mode through the screen when the mandatory reminder mode is activated.

15. The mobile device according to claim 6, further comprising at least a light emitting element, electrically connected to the processor, the processor further activating a flashing mode through the light emitting element when the mandatory reminder mode is activated.

16. The mobile device according to claim 6, further comprising a storage unit, electrically connected to the processor, to store at least one of the preset time, the priority contact list, the preset use situation, and the mandatory reminder mode.

17. A processing method for a priority notification of an incoming call, applied to a mobile device, the processing method comprising:
receiving an incoming call signal and generating a notification signal when the following trigger conditions are met:
determining that a time interval between repeated calls is less than a preset time and a that duration from ringing of an incoming call that is not answered to hang-up exceeds a a predetermined threshold, wherein the duration is a cumulative time of the ringing of the not answered, repeated calls according to the incoming call signal,
determining that a caller number corresponding to the incoming call signal is in a priority contact list, and
determining that the mobile device is in a preset use situation; and
activating a mandatory reminder mode according to the notification signal to notify a user.

* * * * *